(12) United States Patent
Liao

(10) Patent No.: US 8,403,355 B2
(45) Date of Patent: Mar. 26, 2013

(54) GOLF BAG CART FOLDABLE DEVICE

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 145 days.

(21) Appl. No.: 12/943,070

(22) Filed: Nov. 10, 2010

(65) Prior Publication Data

US 2012/0112436 A1    May 10, 2012

(51) Int. Cl.
*B62B 3/02*      (2006.01)
*B62B 3/04*      (2006.01)
*B62B 1/00*      (2006.01)

(52) U.S. Cl. ....... 280/651; 280/40; 280/47.26; 280/642; 280/646; 280/DIG. 6

(58) Field of Classification Search ............ 280/639, 280/40, 646, 655, 47.2, 47.26, 643, 648, 280/DIG. 6, 47.38, 642, 651; 206/315.3
See application file for complete search history.

(56) References Cited

U.S. PATENT DOCUMENTS

| | | | | |
|---|---|---|---|---|
| 5,775,718 | A * | 7/1998 | Huang | 280/642 |
| 5,938,229 | A * | 8/1999 | Chen et al. | 280/642 |
| 6,068,284 | A * | 5/2000 | Kakuda | 280/642 |
| 6,491,348 | B1 * | 12/2002 | Kain | 297/484 |
| 6,581,957 | B1 * | 6/2003 | Lan | 280/642 |
| 6,877,760 | B2 * | 4/2005 | Wang | 280/642 |
| 7,229,132 | B2 * | 6/2007 | Meeker et al. | 297/250.1 |
| 7,278,652 | B2 * | 10/2007 | Riedl et al. | 280/642 |
| 7,780,184 | B2 * | 8/2010 | Ehrenreich et al. | 280/648 |
| 8,186,706 | B2 * | 5/2012 | Dotsey | 280/647 |
| 2010/0052275 | A1 * | 3/2010 | Reimers et al. | 280/47.26 |
| 2011/0074134 | A1 * | 3/2011 | Wang | 280/646 |
| 2012/0032420 | A1 * | 2/2012 | Mazar et al. | 280/648 |

FOREIGN PATENT DOCUMENTS

| | | |
|---|---|---|
| CN | 2561456 Y | 7/2003 |
| CN | 2850658 Y | 12/2006 |
| CN | 2892195 Y | 4/2007 |

* cited by examiner

*Primary Examiner* — J. Allen Shriver, II
*Assistant Examiner* — Andrew Khouzam
(74) *Attorney, Agent, or Firm* — Alan Kamrath; Kamrath IP Lawfirm, P.A.

(57) ABSTRACT

A golf bag cart foldable device includes a bottom cart stand having a link segment. The bottom cart stand is provided with a channel, for sliding by a slider. The bottom cart stand joins a front wheel. An upper cart stand is in pinned connection with the link segment. A rear wheel frame is in pinned connection with the link segment and to a rear wheel. A linkage is connected between the slider and the upper cart stand. A strut bar is connected between the slider and the rear wheel frame. An interlocking mechanism includes a pull handle and a clamping rod having two ends lodged in the long trough. A connection member has two ends connected to the two ends of the clamping rod. A spring is joined to the clamping rod and the upper cart stand.

3 Claims, 9 Drawing Sheets

GOLF BAG CART FOLDABLE DEVICE

BACKGROUND OF THE INVENTION

1. Field of the Invention

This invention relates to a golf bag cart foldable device and, more particularly, to one which features a structure that is handy, easy and smooth in operations.

2. Description of the Prior Art

Prior golf bag cart foldable devices, approximately like the one shown in FIG. 1, have an interlocking mechanism 10 set up between its upper cart stand 11 and bottom cart stand 12. When demanding a fold, the buckle 13 of the interlocking mechanism 10 is first pulled up, and the upper cart stand 11 is pushed forward and down, to have rear wheel frame 16 fold by the connection by a linkage 14 and a stmt bar 15. Reversely, once demanding a unfold, the upper cart stand 11 is pulled up, to unfold the rear wheel frame 16 by the connection by the linkage 14 and the strut bar 15, and the buckle 13 has to be pushed down when the rear wheel frame 16 is bent to its position, to interlock the upper cart stand 11 and the bottom cart stand 12, followed by a forward release of its front wheel 17 to come to the unfolded position.

Due to the location of the buckle 13 of the interlocking mechanism 10 arranged at the bottom portion of the upper cart stand 11, which is low in position, the user has to bend down to pull the buckle 13 for fixing of the upper cart stand 11 and the bottom cart stand 12 once demanding a fold. It means frequent uses surely fatigue the user, which apparently deserves a great improvement.

SUMMARY OF THE INVENTION

The objective of this invention is to provide a golf bag cart foldable device, which features handiness, easiness and smoothness in operation and is capable of improving the drawbacks of the prior art.

To achieve the aforementioned objective, this invention includes a bottom cart stand having a link segment at its top, with the inner wall of the link segment set up with an indent. The internal side of the bottom cart stand is provided with a channel, for sliding by a slider. The far end of the bottom cart stand joins a front wheel. An upper cart stand is in pinned connection with the link segment at its bottom end, and has a long trough at the inner side of its bottom end. A rear wheel frame is in pinned connection with the link segment at its one end, and to a rear wheel at the other end. A linkage is connected between the slider and the upper cart stand. A strut bar is connected between the slider and the rear wheel frame. An interlocking mechanism includes a pull handle set up in the middle of the top portion of the upper cart stand; and a clamping rod set up in the middle of the bottom portion of the upper cart stand with each of its two ends lodged in the long trough. A connection member, hidden in the pull handle and in the upper cart stand, has its two ends connected to the two ends of the clamping rod respectively. A spring is joined to the clamping rod at its one end, and to the upper cart stand at the other end. Accordingly, by the aforementioned structure, operations of unfolding and folding would feature handiness, easiness and smoothness.

DETAILED DESCRIPTION OF THE INVENTION

Figure 1:
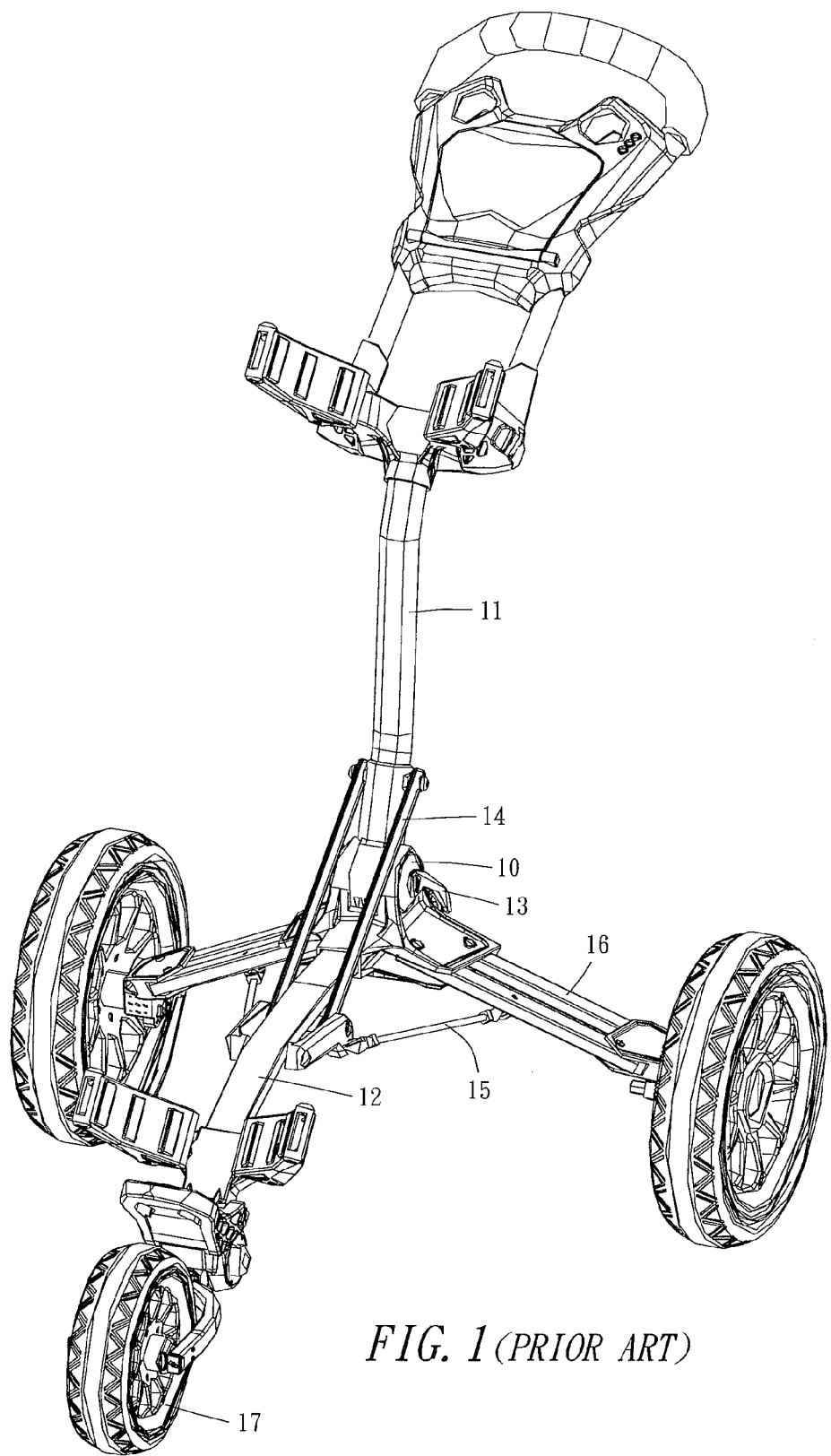
FIG. 1 is a three-dimensional diagram of a prior golf bag cart.

The structural traits and the functions of this invention are detailed described with reference to the following preferred embodiment and the accompanying drawings to comprehend thoroughly the present invention.

Referring to FIGS. 2~6, the golf bag cart of this invention as shown has a structure of bilateral symmetry, and the following description is unilateral for the sake of convenience.

A bottom cart stand 2 has a link segment 21 at its top. The link segment 21 takes on a U-shaped cross-section and forms a ramp 211 at its front portion, and is provided with an indent 212 on top of its inner wall. The bottom cart stand 2 is provided with a bag base 22 and a front wheel 23 at its bottom. The bottom cart stand 2 has a channel 24 along its internal side, for accommodating the sliding by a slider 25.

An upper cart stand 3, in pinned connection with the link segment 21 at its bottom end, is provided with an axle 31 internally, and has a long trough 32 at its internal side.

A rear wheel frame 4 is in pinned connection with the link segment 21 at its one end and to a rear wheel 40 at the other end.

A linkage 41 is connected between the slider 25 and the upper cart stand 3, to generate the connection between the upper cart stand 3 and the slider 25.

A strut bar 42 is connected between the slider 25 and the rear wheel frame 4 to generate the connection between the slider 25 and the rear wheel frame 4.

An interlocking mechanism 5 includes a pull handle 51 set up in the middle of the top portion of the upper cart stand 3; and a clamping rod 52 set up in the middle of the bottom portion of the upper cart stand 3 and with each of its two ends lodged in a long trough 32. The interlocking mechanism 5 further includes a connection member 53, for instance: a steel rope, hidden in the pull handle 51 and in the upper cart stand 3, with its two ends connected to the two ends of the clamping rod 52 respectively. Particularly, the connection member 53 is U-shaped having first and second legs 53a including the two ends of the connection member 53 connected to the two ends of the clamping rod 52 and hidden in the first and second tubes of the upper cart stand 3. The connection member 53 further includes an interconnection 53b extending between and connected to the first and second legs 53a, with the interconnection 53b hidden in the pull handle 51 and extending through a second long trough 3a of each of the first and second tubes of the upper cart stand 3. A spring 54 is joined to the clamping rod 52 at its one end and to the axle 31 of the upper cart stand 3 at the other end, and is able to pull down the clamping rod 52 for being clamped by the indent 212 of the link segment 21.

Figure 2:
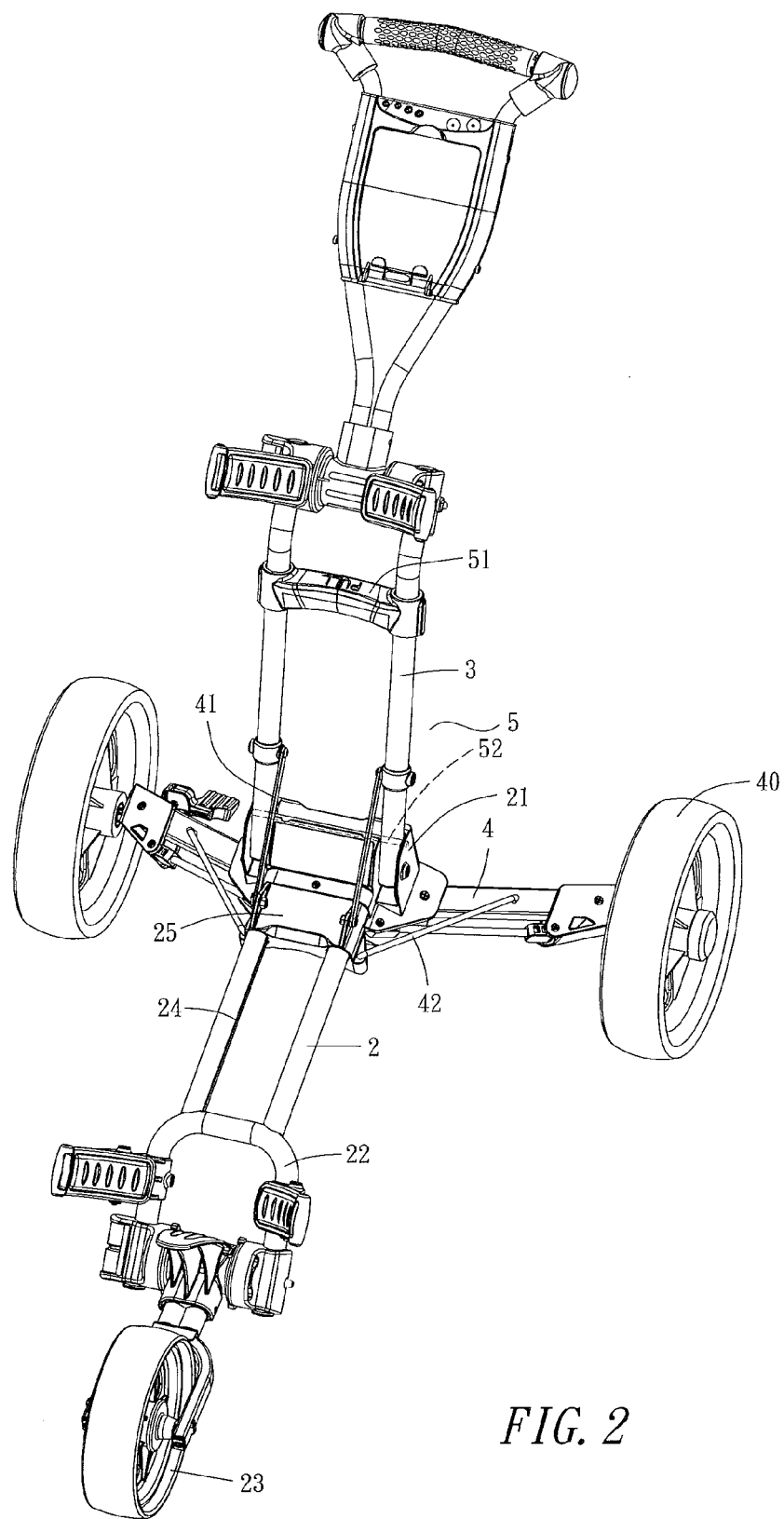
FIG. 2 is a three-dimensional diagram according to the present invention.
Figure 3:
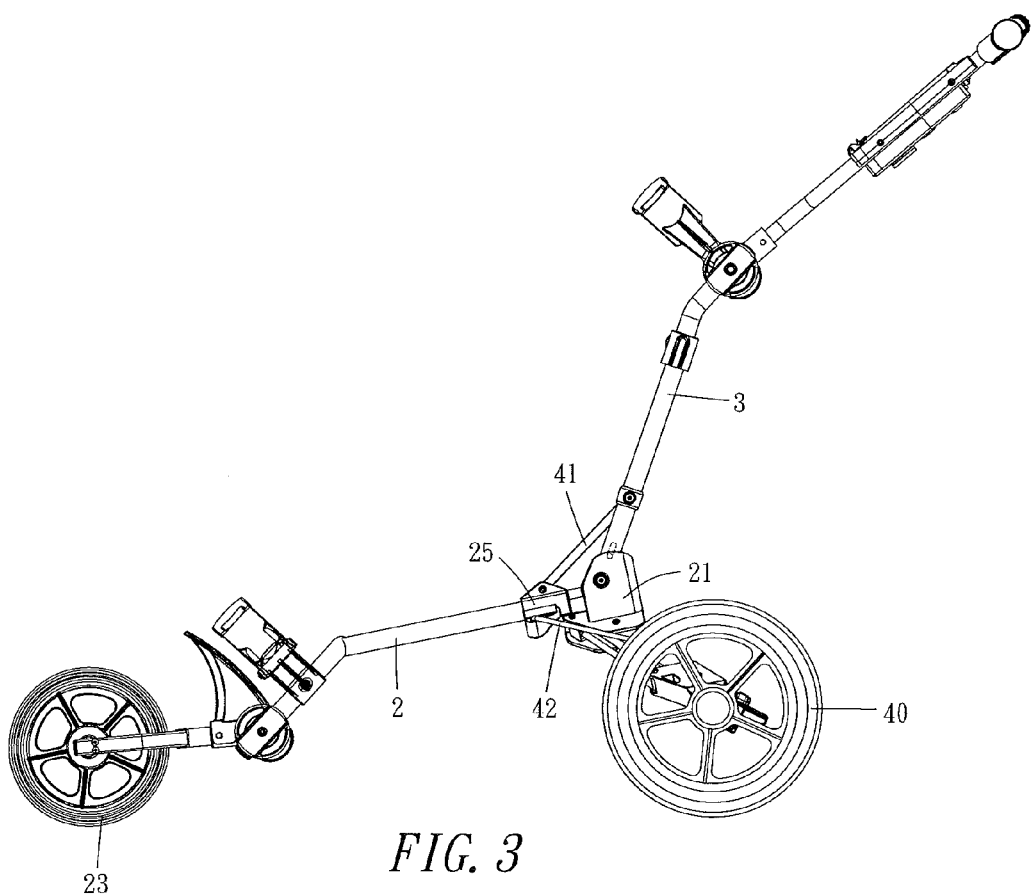
FIG. 3 is a side view according to the present invention.
Figure 4:
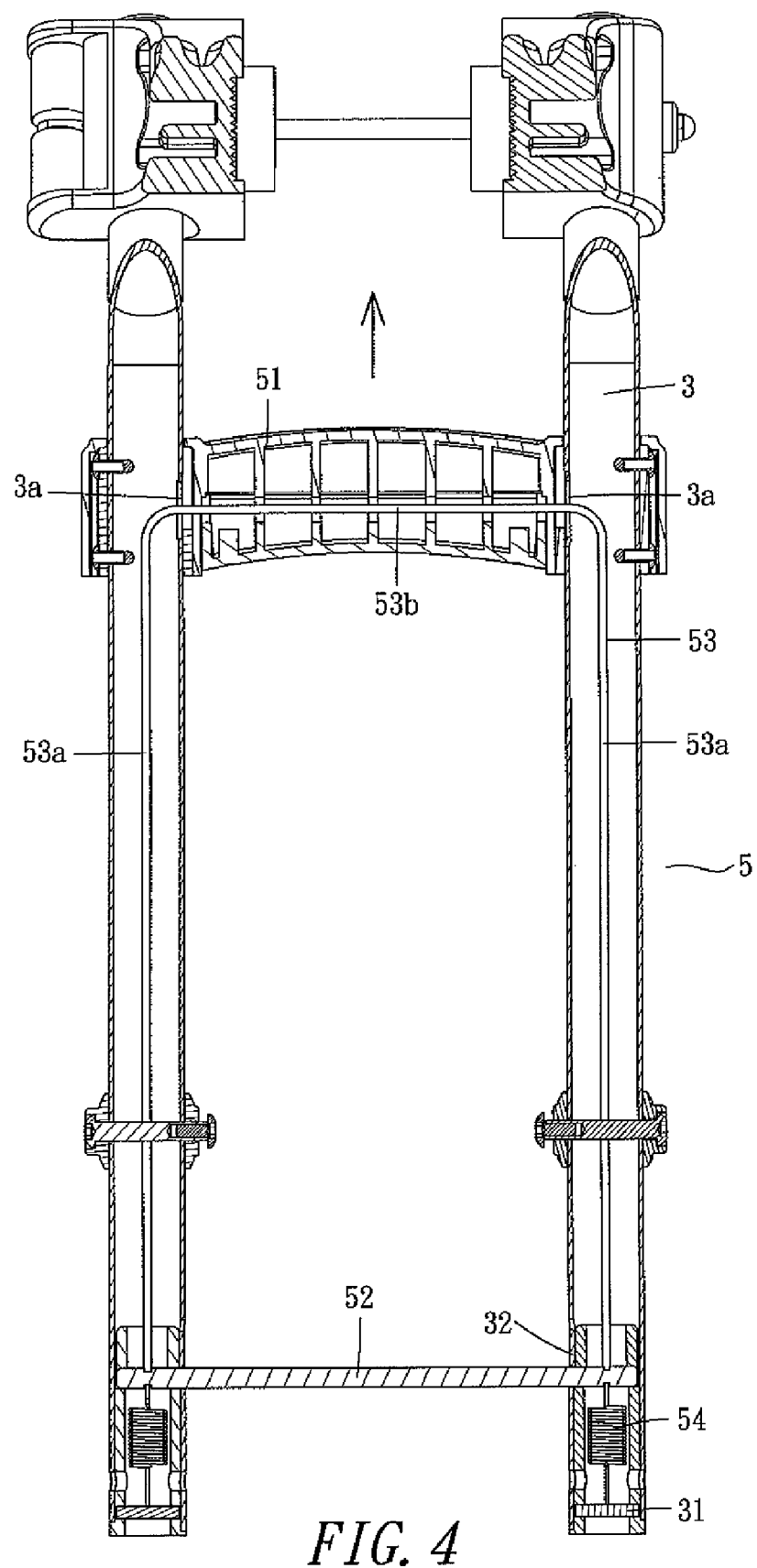
FIG. 4 is an elevational view of the interlocking mechanism according to the present invention.
Figure 5:
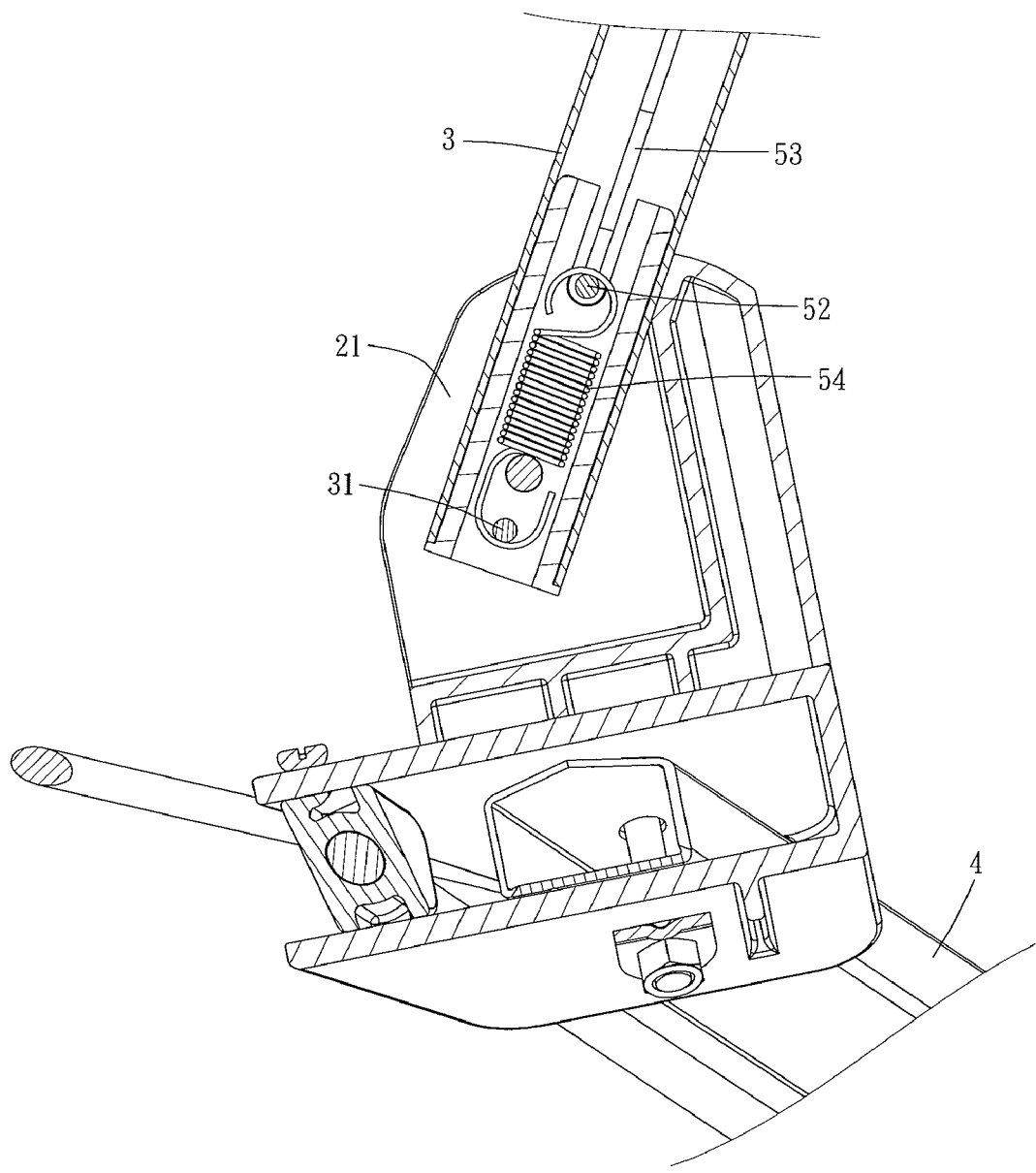
FIG. 5 is an outer side sectional view of the interlocking mechanism according to the present invention.
Figure 6:
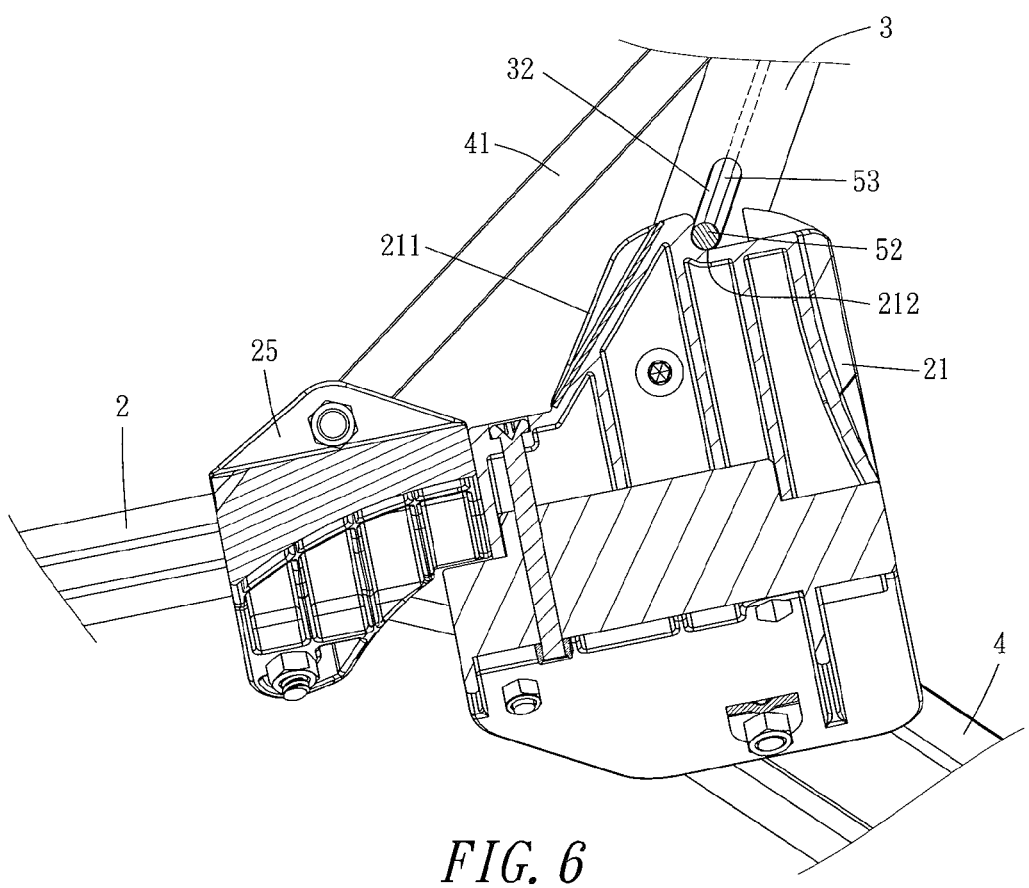
FIG. 6 is an inner side sectional view of the interlocking mechanism according to the present invention.
Figure 7:
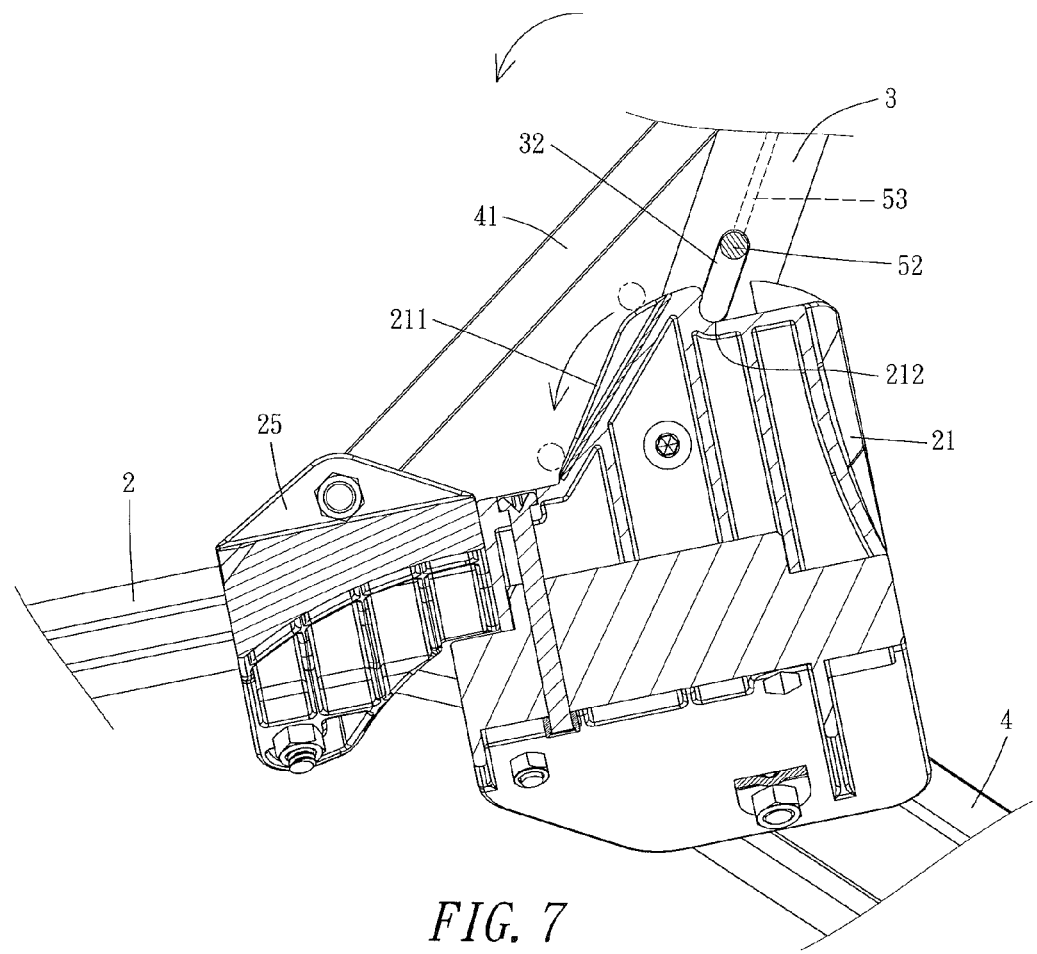
FIG. 7 is a schematic diagram of the motion of the interlocking mechanism according to the present invention.
Figure 8:
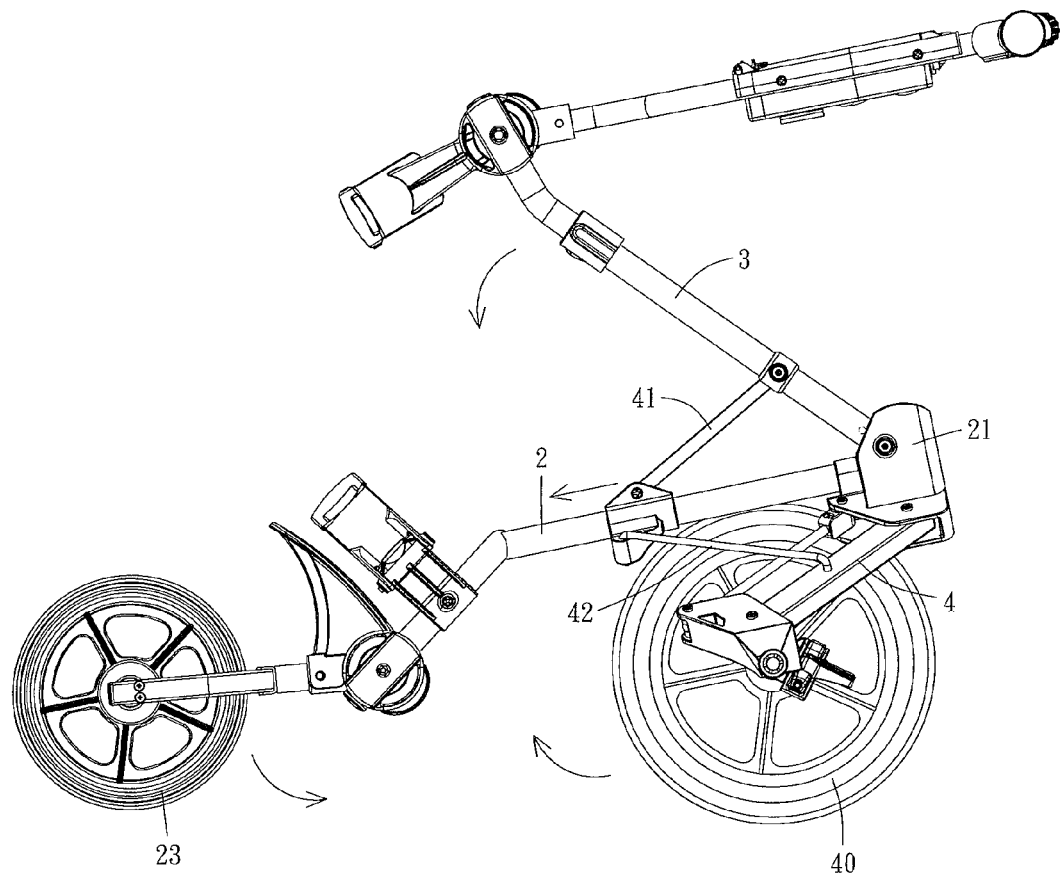
FIG. 8 is a schematic side view during the folding according to the present invention.
Figure 9:
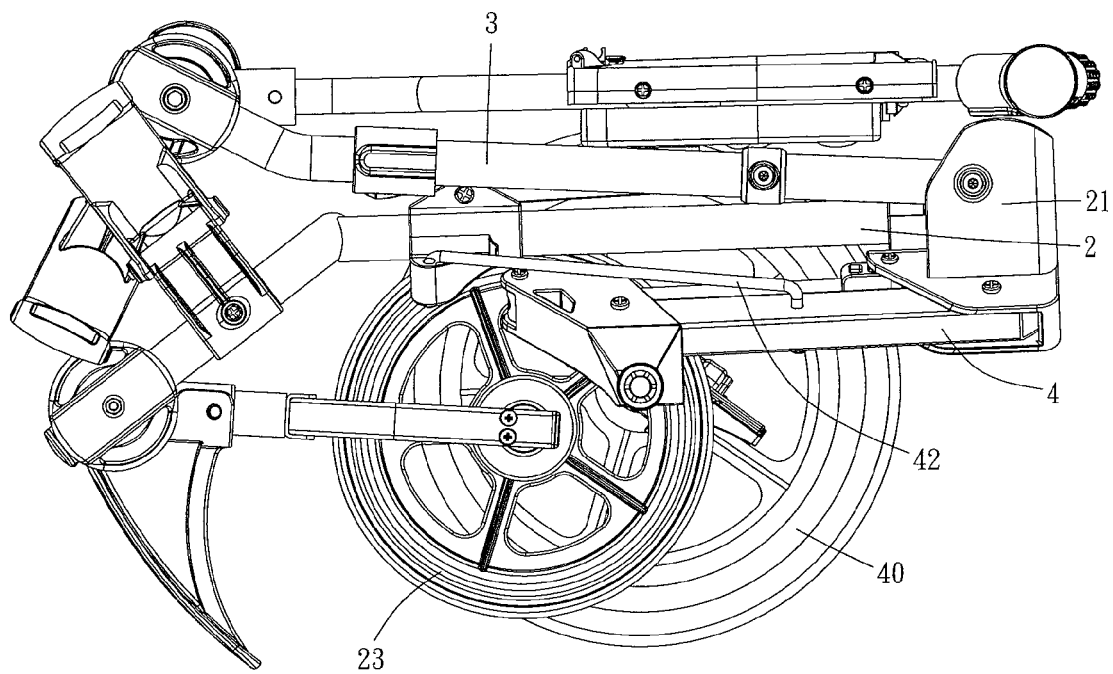
FIG. 9 is a schematic side view of the completed folding according to the present invention.

According to the aforesaid structural combination, the unfolding of this invention is shown in FIGS. 2 & 3, where the spring 54 of the interlocking mechanism 5 is in a normal state, and the clamping rod 52 is clamped in the indent 212, shown in FIGS. 4~6. For desiring a fold, the pull handle 51 is pulled up, shown by the arrow in the FIG. 4, and through the driving by the connecting member 53, the clamping rod 52 moves up along the long trough 32 and releases from the indent 212 of the link segment 21. This is followed by pushing the upper cart stand 3 forward and down to release the pull handle 51, shown in FIGS. 7 & 8. The clamping rod 52 slides down along the ramps 211 at both sides of the link segment 21, and through the support of the resilience of the spring 54, the upper cart stand 3 is ready to be folded down. Meanwhile, the slider 25 driven by the linkage 41 moves forward on the bottom cart stand 2, and simultaneously pulls the rear wheel frame 4 to move forward and inward through the pulling by the strut bar 42. This further drives the rear wheels 40 to move forward and inward for folding. Finally, the front wheel 23 is turned downward and inward for a fold at the underside of the bottom cart stand 2, shown in FIG. 9, to accomplish the folding process.

Reversely, for desiring an unfold, the front wheel 23 is first turned upward and outward to its position, followed by pushing the upper cart stand up. Due to the connection by the linkage 41, the slider 25, the strut bar 42 and the rear wheel frame 4, the slider 25 is forced to slide toward the link segment 21, which enables the rear wheels to unfold to its position. At the moment the upper cart stand 3 is pulled up, the clamping rod 52 slides up along the ramps 211, forcing the spring 54 to stretch, until the clamping rod 52 moves to the top of the indent 212. Then, due to the resilience of the spring 54, the clamping rod 52 falls right into the indent 212, which enables the upper cart stand 3 to unfold to its position, and enables the upper cart stand 3 and the bottom cart stand 2 to interlock with each other, to accomplish the unfolding process, and which is shown in FIGS. 2, 3 & 6.

From the aforesaid description, this invention features at least the following advantages and functions, which is more creative than the prior art:

1. During the action of folding and since the pull handle 51 of the interlocking mechanism 5 is set up at the top portion of the upper cart stand 3, which is high enough in position that the user is handy to operate without the need for bending one's back, it substantially reduces fatigues during operation. Also, it is indeed handy, easy and smooth in operations.

2. During the action of unfolding, the upper cart stand 3 and the bottom cart stand 2 are pushed to a specific widened position, with the clamping rod 52 of the interlocking mechanism 5 and the indent 212 of the link segment 21 interlocked with each other automatically. There is no need for an additional step to lock the interlocking mechanism 5, which enables the upper cart stand 3 and the bottom cart stand 2 to be placed to their positions. Also, this is surely easier in operations.

To sum up, the disclosed structure of the preferred embodiment of this invention is not only unknown to the prior art, but surely can accomplish the expected objectives and functions, which is construed as novel and creative.

What is claimed is:

1. A golf bag cart foldable device comprising:
    a bottom cart stand having a link segment at a top end thereof, wherein the link segment is set up with an indent at an inner wall thereof, with an inner lateral side of said bottom cart stand provided with a channel, and with said bottom cart stand joining a front wheel at a bottom end thereof;
    an upper cart stand in pinned connection with the link segment at a bottom end thereof, with the upper cart stand including first and second tubes each having a first long trough extending through the first and second tubes at an inner lateral side adjacent the bottom end of the upper cart stand and a second long trough extending through the first and second tubes at the inner lateral side adjacent a top portion of the upper cart stand;
    first and second rear wheel frames each in pinned connection with the link segment at one end thereof and to a rear wheel at another end thereof;
    a slider slideable in the channel of the bottom cart stand;
    a linkage joined to the slider and to said upper cart stand;
    two strut bars joined to the slider and to each said first and second rear wheel frames, respectively; and
    an interlocking mechanism further comprising: a pull handle slideably mounted between the first and second tubes adjacent the top portion of said upper cart stand; a clamping rod extending between the first and second tubes of said upper cart stand and having two ends lodged in the first long troughs of the inner lateral sides of the first and second tubes of the upper cart stand; a connection member hidden in the pull handle and in the first and second tubes of said upper cart stand and having two ends connected to the two ends of the clamping rod respectively; and two springs connected to the clamping rod and to the first and second tubes of said upper cart stand respectively, with the two springs located inside of the first and second tubes of the upper cart stand.

2. The golf bag cart foldable device as in claim 1 wherein the connection member of said interlocking mechanism is a steel rope.

3. The golf bag cart foldable device as claimed in claim 1 wherein the connection member is U-shaped having first and second legs including the two ends of the connection member connected to the two ends of the clamping rod and hidden in the first and second tubes of the upper cart stand; and wherein the connection member includes an interconnection extending between and connected to the first and second legs, with the interconnection hidden in the pull handle and extending through the second long trough of each of the first and second tubes of the upper cart stand.

* * * * *